Oct. 7, 1924.
W. H. SOMMER
REEL
Filed June 28, 1922
1,510,750
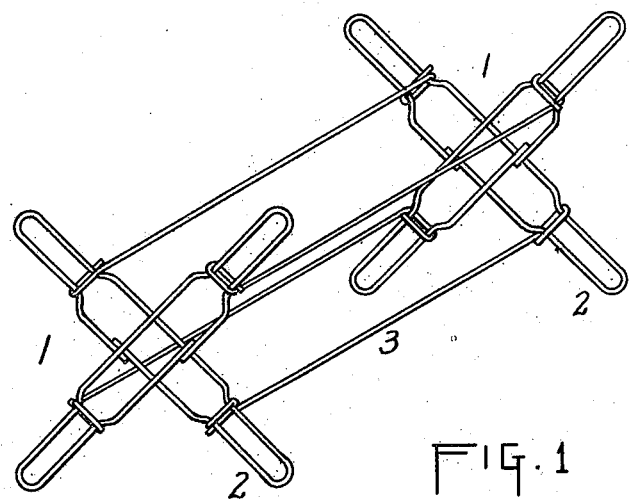
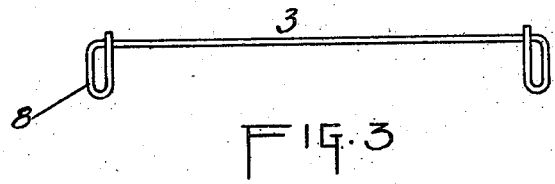
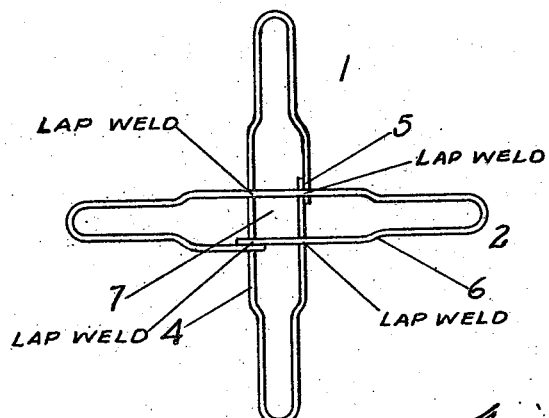

Patented Oct. 7, 1924.

1,510,750

UNITED STATES PATENT OFFICE.

WILLIAM H. SOMMER, OF PEORIA, ILLINOIS, ASSIGNOR TO KEYSTONE STEEL & WIRE COMPANY, OF BARTONVILLE, ILLINOIS, A CORPORATION OF ILLINOIS.

REEL.

Application filed June 28, 1922. Serial No. 571,557.

*To all whom it may concern:*

Be it known that I, WILLIAM H. SOMMER, a citizen of the United States, a resident of Peoria, in the county of Peoria and State of Illinois, have invented new and useful Improvements in Reels, of which the following is a specification.

This invention has reference to reels and relates particularly to that type of reel on which is wound barb-wire, altho it is useful for holding plain wire, or like material.

The invention has for its principal object to construct a reel of the character referred to entirely of wire, and including end members and tie-rods. Such a reel being light and inexpensive to make, and yet sufficiently strong to serve the purposes intended.

The invention has for a further object to provide a reel the end members of which each comprise elongated looped members laid transversely across each other to provide arms for the connection of suitable tie-rods; said members where they intersect being preferably united by "lap-welding" the same together; said tie-rods being formed with loops at their opposite ends for connection with the arms of the end members by being slipped over the ends of said arms.

A further object of the invention is to connect the arms of the end members by tie-rods, which comprise wires formed at their opposite ends with right angularly formed loops or eyes, the ends of the loops being turned inwardly whereby when the tie-rods are connected to the end members and wire is wound on the reel, the wire will act as a lug against the inturned ends of the loops to prevent the opening up of said loops.

That the invention may be more fully understood reference is had to the accompanying drawings forming a part of the description, illustrating a preferred embodiment of the invention in which:

Fig. 1 is a perspective view of a reel embodying my invention;

Fig. 2 is a view of one end of the reel showing the manner of welding transversely disposed looped members to each other, and Fig. 3 is a view illustrating one of the tie-rods.

Like characters of reference denote corresponding parts thruout the figures.

The reel includes when assembled end members 1, 1 each formed with a plurality of radially disposed arms 2, the respective arms of which are connected by the spacing tie-rods 3. The wire from which the respective end members are made, and the wire used for forming the tie-rods may be of any gauge suitable to give sufficient strength to the structure for such purposes as the reel may be intended for use, and the diameter and length of the reel will of course be determined by the size of the end members 1 and the length of the tie-rods 3.

In the preferred form each end member 1 is made from two preferably elongated looped members which are placed at right angles across each other, as shown in Fig. 2, so that each end member is formed with the plurality of arms 2 to which are connected the tie-rods 3. For convenience each elongated looped member in an end member is designated 4 and comprise a wire bent into the form of an elongated loop as shown, with the meeting ends of the wire over-lapping for a short distance as shown at 5. Said elongated looped members at points suitably removed from their opposite ends are formed with shoulders 6 producing the reduced end portions constituting the arms 2 over which are slipped the looped ends of the tie-rods to be described, said looped ends of the tie-rods engaging the shoulders 6 and the resiliency of the metal of the arms acting to prevent the outward movement of the tie-rods.

In the construction of an end member 1 a pair of elongated looped members comprising the wires 4 are laid cross-wise of each other as shown in Fig. 2 so as to produce a symmetrical figure substantially star-shaped and where the wires of respective looped members cross each other they are "lap-welded" as indicated, not only producing in effect a unified structure but strengthening the frame work thereof. The cross-wise arrangement of the elongated looped members of the end members 1 produce the axially disposed openings 7 which provide a journal bearing for the insertion of a spindle, not shown, which may serve to support the reel when winding and unwinding the barb-wire, plain-wire or other material.

Referring to the tie-wires 3 each are formed at their opposite ends with loops or eyes 8. Such loops or eyes are formed by bending the ends of the tie-wires at right angles and in the same plane and then inturning or bending back the ends of said loops or eyes, so as to cross the main body of the tie-rods as shown in Fig. 3. In the assembling of the reel and to connect the respective arms 2 of the opposite end members 1 the loops 8 are slipped down over the arms 2 to the point of engagement with the shoulders 6 thereof, as previously explained. The inturned portions of the loops or eyes will lie next adjacent to the wire which may be wound on the reel, and such wire when brought into engagement with the inturned ends of the loops or eyes will act as a lug to prevent the opening up of such inturned ends of said tie-rods.

I lay no claim to the knocked-down feature disclosed in the construction of the reel, but it is obvious that reels constructed in the manner in which I have disclosed may be conveniently handled in factories where barb-wire is manufactured, as each reel may be left in knocked-down form until it is desired to use the same when an attendant may very quickly assemble a pair of end members by the connection of tie-rods thereto in manner described and shown. It must also be obvious when reels of wire are shipped to remote points and the wire unwound therefrom, the reels could be quickly disassembled or knocked-down and reshipped to the point of manufacture at a very small expense.

I am aware that it is not new in the art to construct a reel of the character herein referred to entirely of wire, but I am not aware of a reel embodying the novel features of construction contained in the end members shown and provided with journal bearings to receive a spindle or like member, such end members being connected by tie-rods formed as shown.

What I claim is:—

A wire reel including pairs of transversely related end members lap welded to each other, each member formed from a wire bent into an elongated loop with their meeting ends overlapping and intersecting a section of the other member and lap welded thereto and with reduced terminal ends providing shoulders, and rods connecting opposite terminal ends of corresponding end members by loops encircling said terminal ends at their shouldered portions.

In witness whereof, I have hereunto affixed my hand this 17th day of June, 1922.

WILLIAM H. SOMMER.